(12) United States Patent
Nishigaki et al.

(10) Patent No.: US 6,661,440 B2
(45) Date of Patent: Dec. 9, 2003

(54) IMAGE FORMING APPARATUS WITH IMPROVED IMAGE REGISTRATION

(75) Inventors: Junji Nishigaki, Toyokawa (JP); Yoshihiko Hirota, Toyokawa (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/961,307

(22) Filed: Sep. 25, 2001

(65) Prior Publication Data

US 2002/0051048 A1 May 2, 2002

(30) Foreign Application Priority Data

Sep. 27, 2000 (JP) ........................... 2000-293606

(51) Int. Cl.⁷ .................. B41J 2/385; G01D 15/06; G03G 15/01
(52) U.S. Cl. ....................... 347/116; 399/302
(58) Field of Search ................ 347/116; 399/301, 399/299, 302

(56) References Cited

U.S. PATENT DOCUMENTS

| | | | | |
|---|---|---|---|---|
| 5,576,753 A | * | 11/1996 | Kataoka et al. | |
| 5,940,114 A | * | 8/1999 | Kataoka et al. | 347/116 |
| 6,137,517 A | * | 10/2000 | Furst et al. | 347/116 |
| 6,321,060 B1 | * | 11/2001 | Nakayasu et al. | 399/301 |
| 6,348,937 B2 | * | 2/2002 | Hata | 347/116 |

FOREIGN PATENT DOCUMENTS

| | | | |
|---|---|---|---|
| JP | 1-142673 | * | 6/1989 |
| JP | 6-51607 | * | 2/1994 |
| JP | 10-10830 | * | 1/1998 |
| JP | 10-148992 | | 6/1998 |
| JP | 11-15221 | | 1/1999 |

* cited by examiner

*Primary Examiner*—Susan S. Y. Lee
(74) *Attorney, Agent, or Firm*—Morrison & Foerster LLP (57) ABSTRACT

In an image forming apparatus, a color registration error correction computing portion calculates optimal typical value of position change quantity for each image forming region. Based on these typical values, write timing at each of write portions is controlled by an image control portion. That is, color registration error correction is executed based on optimal correction quantity for each image forming region.

14 Claims, 9 Drawing Sheets

| BELT POSITION | B(0) | B(1) | B(2) | · · · · · · | B(N) |
|---|---|---|---|---|---|
| POSITION CHANGE QUANTITY | R(0) | R(1) | R(2) | · · · · · · | R(N) |

IMAGE FORMING APPARATUS WITH IMPROVED IMAGE REGISTRATION

This application is based on Application No. 2000-293606 filed in Japan, contents of which is hereby incorporated by reference.

BACKGROUND OF THE INVENTION

1. Field of the Invention

The present invention relates to an image forming apparatus for forming a full color image by superimposing different color images. More particularly, the present invention relates to an image forming apparatus capable of reducing an occurrence of color registration error and maintaining uniform coloring among pages.

2. Description of Related Art

In an image forming apparatus for forming a full color image by superimposing different color images, it is required to precisely superimpose images on one another. Otherwise, color registration error occurs and an image quality is degraded. Such color registration error occurs because an image transfer position of a reference color and that of other colors are relatively shifted one another due to a speed change or the like of a transfer belt.

In order to prevent such color registration error, the following registration correction is generally carried out. That is, a plurality of registration patterns are formed on a transfer belt prior to forming an image. These patterns are repeatedly sampled at a predetermined timing by a registration detecting sensor. Further, a registration quantity of other colors (for example, cyan, magenta, or yellow) relevant to a reference color (for example, black) is detected from the thus obtained sampling data, and this detected quantity is divided by the sampling count, thereby calculating an average registration quantity. Then, registration correction (color registration error correction) is carried out based on this average registration quantity.

Further, a technique for improving precision of this registration correction is disclosed in Japanese Laid-open Patent Publication No. 10-148992. In this technique, during a non-image formation period, a registration pattern is formed over the entire periphery of a transfer belt. Next, these patterns are repeatedly sampled at a predetermined timing by a registration detecting sensor, registration quantity is detected at each sampling timing, and a typical value of the registration quantity is calculated. Then, difference data between the registration quantity at each sampling timing and the typical value is calculated. On the other hand, during an image formation period, registration patterns are first formed between image forming regions of a transfer belt. Next, these registration patterns are repeatedly sampled at a predetermined timing by a registration detecting sensor, the registration quantity at each sampling timing is detected, and the respective registration quantities are compensated for by the corresponding difference data. Then, the compensated data is employed to calculate the typical value of the registration quantity.

In this manner, during an image formation period, a change in registration quantity for each sampling timing is offset by the corresponding difference data. Thus, during an image forming period as well, the typical value of the registration quantity can be calculated at a level equal to that during a non-image formation period.

However, in the above described conventional technique, there has been a problem that an occurrence of color registration error cannot be completely reduced. This is because a deviation occurs between the typical value of the registration quantity employed for registration correction (average value of total sampling values) and a correction quantity actually required for registration correction. That is, a position change on a transfer belt occurs periodically, and thus, a correction quantity required for each image forming region changes depending on a position of an image forming region on the transfer belt. Therefore, in a region in which the position change quantity greatly differs from the typical value of the registration quantity, if registration correction is carried out based on the typical value of the registration quantity at the entire periphery of the transfer belt (average value of total sampling values), color registration error becomes significant. In addition, in the case where images are formed by a plurality of pages, the required correction quantities differ with each page. Thus, color registration error that occurs with each page changes. Therefore, there has been a problem that the coloring of each page changes.

SUMMARY OF THE INVENTION

The present invention has been made in order to solve the foregoing problem. It is an object of the present invention to provide an image forming apparatus capable of preventing an occurrence of color registration error and maintaining uniform coloring among pages by determining a typical value of an optimal registration quantity for each image forming region.

According to one aspect of the present invention, there is provided an image forming apparatus comprising: a plurality of image forming units for forming images with different colors; an image carrier for carrying a multi-color image produced by superimposing images formed at each of the image forming units sequentially; a position detecting sensor for detecting a reference position provided at the image carrier; a position change quantity calculator for calculating position change quantity of other colors against a reference color; a storage device for storing position change quantity calculated by the position change quantity calculator; an image forming start position calculator for calculating an image forming start position based on a detection signal detected by the position detecting sensor; an image forming region calculator for calculating a position of an image forming region on the image carrier based on an image forming start position calculated by the image forming start position calculator and a length of an image formed by each of the image forming units; a typical value calculator for reading out position change quantity at a predetermined position of the image carrier that corresponds to an image forming region calculated by the image forming region calculator from the storage device, and calculating a typical value of the position change quantity readout; and a controller for controlling operation of the plurality of image forming units based on the typical value for each image forming region calculated by the typical value calculator. The "position change quantity" means a quantity of position error of other color relevant to a reference color caused by speed change or the like of an image carrier.

This image forming apparatus comprises a plurality of image forming units for forming an image with different colors, a controller for controlling operation of the plurality of the image forming units; and an image carrier for carrying a multi-color image produced by superimposing images formed at each of the image forming units sequentially. Thereby, a multi-color image can be formed. Here, when sequentially superimposed multi-color images are carried, they may be carried on the image carrier directly or may be carried indirectly via a recording medium. That is, the present invention is applicable to an image forming apparatus in accordance with an ink jet process or a silver salt process and the like as well as an image forming apparatus in accordance with an electrophotographic process. In case of electrophotographic process or ink jet process, plain paper is primarily used as a recording medium. In case of silver salt process, photosensitive paper is primarily used as a recording medium.

In order to form a multi-color image by thus superimposing different images, the image forming apparatus according to the present invention carries out the following control so that the images of colors can be precisely superimposed on each other. First, a reference position provided at an image carrier is detected by a position detecting sensor. Then, during a non-image formation period, position change quantity of other colors relevant to the reference color is calculated by the position change quantity calculator. The position change quantity calculated by the position change quantity calculator is stored in the storage device. The non-image formation period includes a state in which an image is not formed and a state immediately after the image forming apparatus is powered ON.

During an image formation, an image forming start position is first calculated by an image forming start calculator based on a detection signal detected by a position detecting sensor. Next, an image forming region calculator calculates a position of an image forming region on an image carrier based on the image forming start position calculated by the image forming start position calculator and a length of an image formed by each of the image forming units.

Further, by a typical value calculator, the position change quantity at a predetermined position of the image carrier that corresponds to the image forming region calculated by the image forming region calculator is read out from the storage device, and the typical value of these position change quantities is calculated. Then, operation of each image forming means is controlled by a controller based on the typical value for each image forming region calculated by the typical value calculator. That is, registration correction is executed based on the optimal typical value for each image forming region. In this manner, an occurrence of color registration error can be reliably prevented. In addition, even when images are formed by a plurality of pages, registration correction for each page is done based on the optimal typical value. Thus, uniform coloring among pages can be maintained.

According to another aspect of the present invention, there is provided an image forming apparatus comprising: a plurality of image forming units for forming images with different colors; an image carrier for carrying a multi-color image produced by superimposing images formed at each of the image forming units sequentially; a position detecting sensor for detecting a reference position provided on the image carrier every traveling cycle of the image carrier; a position change quantity calculator for calculating position change quantity of other colors against a reference color at a respective one of a plurality of predetermined positions in the image carrier determined based on a detection signal detected by the position detecting sensor; a storage device for storing the position change quantity calculated by the position change quantity calculator; an image forming start position calculator for calculating an image forming start position based on the detection signal detected by the position detecting sensor; an image forming region calculator for calculating a position of an image forming region on the image carrier based on the start position calculated by the image forming start position calculator and a length of an image formed by each of the image forming units; a typical value calculator for reading out position change quantity at a predetermined position of the image carrier that corresponds to the image forming region calculated by the image forming region calculator from the storage device, and calculating the typical value of the position change quantity readout; and a controller for controlling image write timing of each image forming unit based on the typical value of each image forming region calculated by the typical value calculator.

This image forming apparatus as well carries out control that is basically similar to the above described image forming apparatus. Therefore, operation of each image forming unit, i.e., image write timing, is finally controlled by a controller based on a typical value of each image forming region calculated by the typical value calculator. Here, the position detecting sensor detects a reference position every traveling cycle of the image carrier. In addition, by the position change quantity calculator, in a plurality of predetermined positions of the image carrier determined based on the detection signal detected by the position detecting sensor, the position change quantity of other colors against the reference color at a respective one of these predetermined positions is calculated. Based on these facts, registration correction based on an optimal typical value can be reliably executed with respect to each image forming region. Therefore, an occurrence of color registration error can be prevented precisely, and uniform coloring among pages is maintained.

According to still another aspect of the present invention, there is provided an image forming apparatus comprising: a plurality of image forming units; an image carrier for carrying an image produced by superimposing images formed at the plurality of image forming units; a detection device for detecting a position of an image forming region on the image carrier; a calculating device for calculating a typical value of position change quantity of other colors against a reference color in an image forming region detected by the detection device; and a controller for controlling operation of the plurality of image forming units based on a typical value calculated by the calculating device.

In this image forming apparatus, images are formed by a plurality of image forming units, and are carried by the image carrier with being superimposed on one another. By doing this, the detection device detects a position of image forming region on the image carrier. Subsequently, the typical value of the position change quantity of other colors against a reference color in the image forming region detected by the detection device is calculated by the calculating device. Then, operation of a plurality of image forming units is controlled by the controller based on the typical value calculated by the calculating device. Namely, registration correction is executed based on optimal typical value for each image forming region. In this manner, an occurrence of color registration error can be reliably prevented. In addition, when images are formed by a plurality of pages, registration correction is done based on the optimal typical value for each page. Thus, uniform coloring among pages can be maintained.

DETAILED DESCRIPTION OF THE INVENTION

Figure 1:
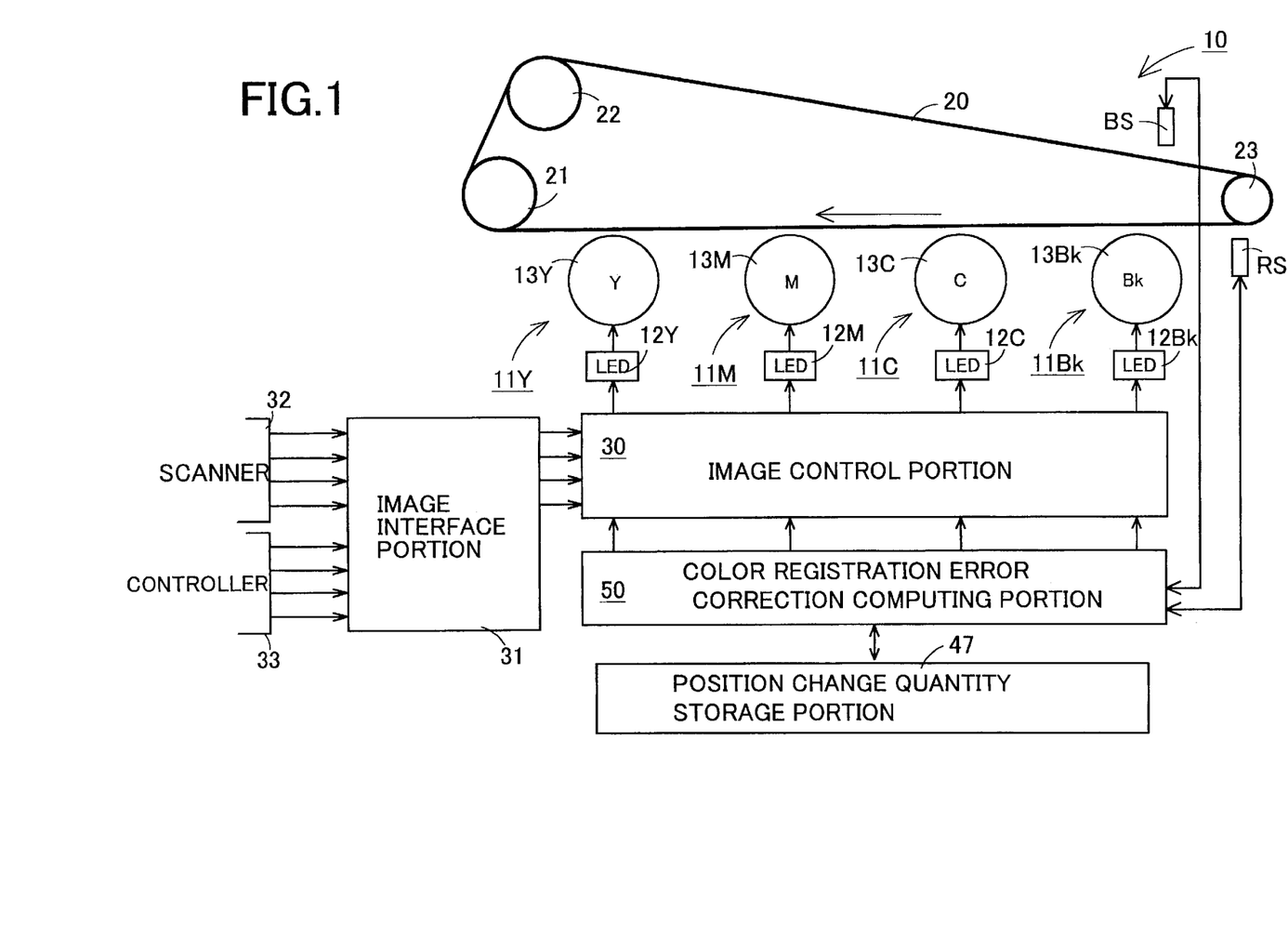
FIG. 1 is a schematic structure of an image forming apparatus directed to the embodiment.

Hereinafter, preferred embodiments of an image forming apparatus according to the present invention will be described with reference to the accompanying drawings. As shown in FIG. 1, an image forming apparatus 10 according to the present embodiment comprises: image forming portions 11Bk, 11C, 11M, and 11Y; a transfer belt 20; an image control portion 30; a color registration error correction computing portion 50; a belt position detecting sensor BS; and two registration detecting sensors RS.

Each of the image forming portions 11Bk, 11C, 11M, and 11Y forms an image (including a registration pattern) on a transfer belt 20. The image forming portions 11Bk, 11C, 11M, and 11Y include write portions 12BK, 12C, 12M, and 12Y, photosensitive drums 13Bk, 13C, 13M, and 13Y, respectively, and respective peripheral device (such as charger, developing device, transfer charger, cleaner, or the like). At each of the image forming portions 11Bk, 11C, 11M, and 11Y, a latent image written on the surface of each of the photosensitive drums 13Bk, 13C, 13M, and 13Y is developed to a toner image by each of the write portions 12Bk, 12C, 12M, and 12Y so that such toner image is transferred on the transfer belt 20. At this time, toner images with different colors depending on the image forming portions 11Bk, 11C, 11M, and 11Y each are transferred to be superimposed sequentially on the transfer belt 20 so that a multi-color image is formed. An LED array is employed for each of the write portions 12Bk, 12C, 12M, and 12Y.

Figure 2A:
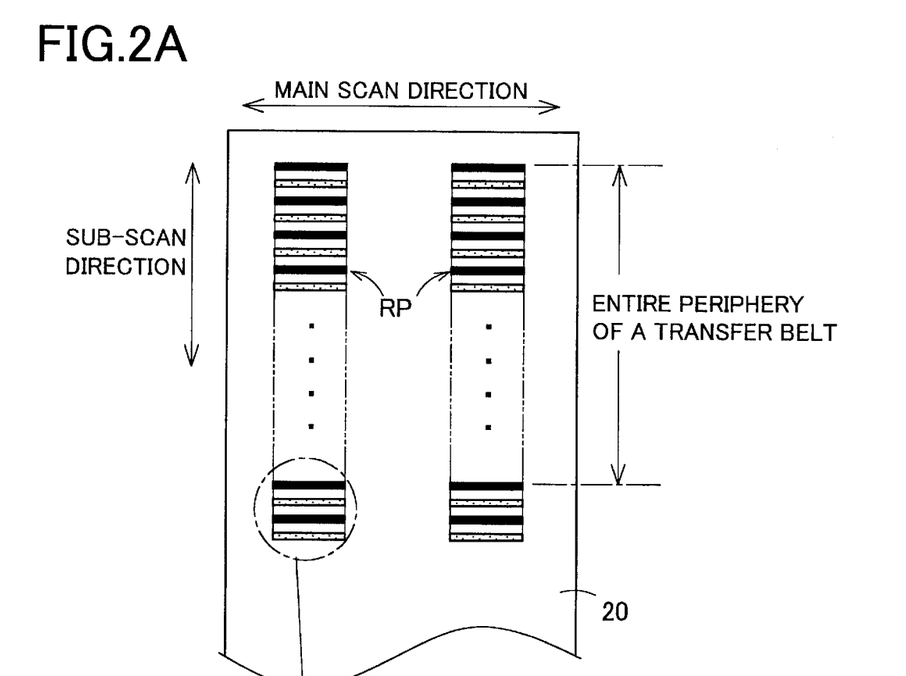
FIG. 2A and FIG. 2B are a set of diagrams to explain a structure of a registration pattern.

The transfer belt 20 is a ring belt that is traveled in a direction indicated with the arrow shown in the figure by rotational drive of a drive roller 21, and is wound by two follower rollers 22 and 23 as well as the drive roller 21. One belt position detecting sensor BS and two registration detecting sensors RS are provided on the travel passage of this transfer belt 20. The belt position detecting sensor BS detects a reference position provided at the transfer belt 20, and outputs a pulse signal every cycle of the transfer belt 20. In addition, the registration detecting sensor RS detects a registration pattern formed on the transfer belt 20 by each of the image forming portions 11Bk, 11C, 11M, and 11Y. These two registration detecting sensors RS are disposed in parallel in a main scan direction (a direction orthogonal to the traveling direction (sub-scan direction) of the transfer belt 20). That is, in FIG. 1, these sensors are disposed in front of and at the back of paper face one by one. In this manner, a registration pattern RP formed at both ends of the transfer belt 20 as shown in FIG. 2A can be sampled.

Figure 2B:
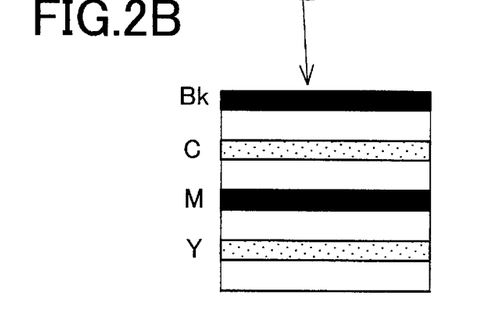

The registration pattern RP is formed over the entire periphery of the transfer belt 20 by the image forming portions 11Bk, 11C, 11M, and 11Y during a non-image formation period. The full length when the transfer belt 20 is exploded is about 960 mm. In addition, the registration pattern RP is such that patterns formed with predetermined intervals in order of black (Bk), cyan (C), magenta (M), and yellow (Y) as shown in FIG. 2B are repeated. In the present embodiment, the length of a repetition unit pattern (refer to FIG. 2B) in the registration pattern RP is about 16 mm. That is, a construction is provided such that the multiple of unit pattern is equal to the full length of the transfer belt 20.

Figure 3:
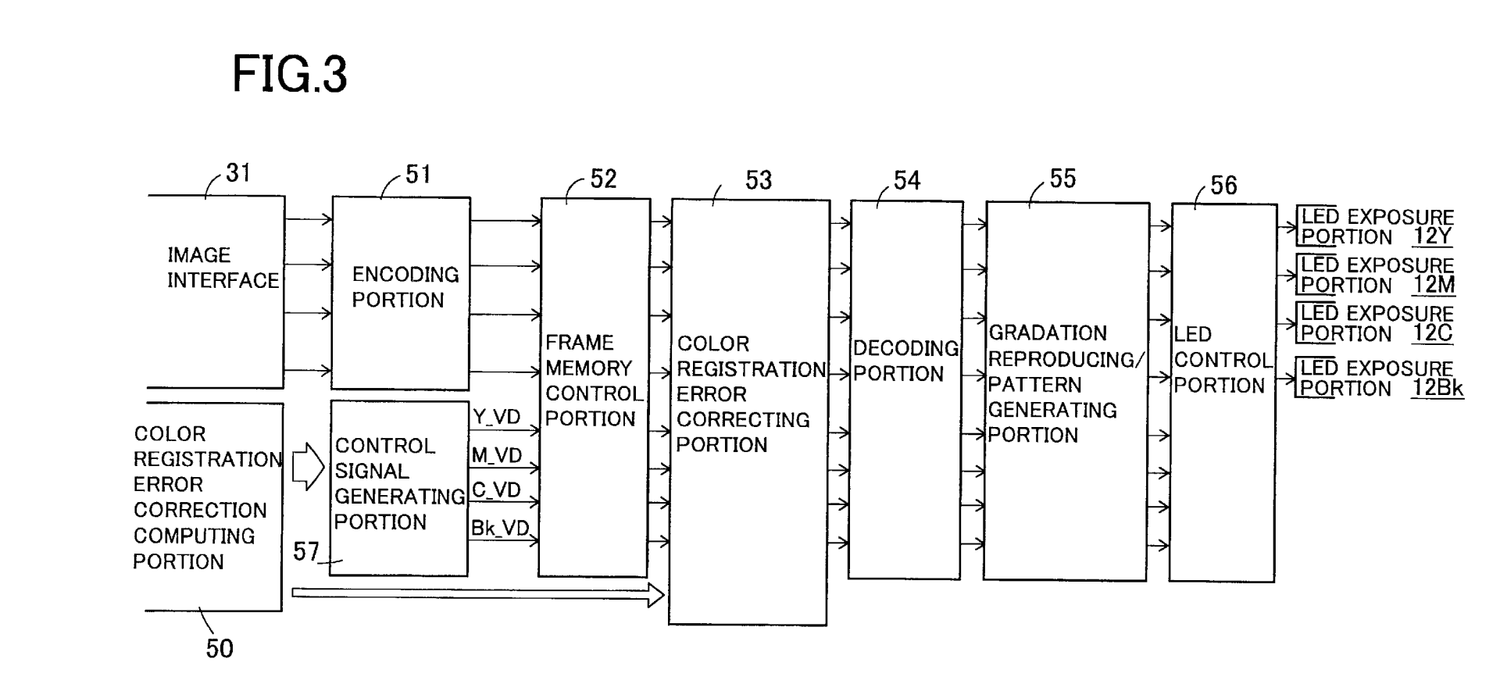
FIG. 3 is a block diagram showing a structure of an image control portion.

Turning to FIG. 1, an image control portion 30 provides an image signal of an image to be recorded on a recording medium to each of the image forming portions 11Bk, 11C, 11M, and 11Y, and controls operation of each of the image forming portions 11Bk, 11C, 11M, and 11Y. Thus, the image control portion 30 is connected to a scanner 32 or a controller 33 via an image interface portion 31 so as to obtain an image signal or the like from these elements. This image control portion 30, as shown in FIG. 3, includes an encoding portion 51, a frame memory control portion 52, a color registration error correction portion 53, a decoding portion 54, a gradation reproducing/pattern generating portion 55, an LED control portion 56, and a control signal generating portion 57.

The encoding portion 51 applies compression processing to image data inputted from the image interface portion 31. The frame memory control portion 52 generates an image write timing phase difference relevant to the image data that corresponds to each color. This frame memory control portion 52 carries out image editing (such as 2 in 1 processing or rotation processing). The color registration error correction portion 53 carries out respective color registration error correction for the image data of each color relevant to the main scan direction and sub-scan direction at each of the write portions 12Bk, 12C, 12M, and 12Y. The decoding portion 54 applies decompression processing to the image data outputted from the color registration error correcting portion 53. The gradation reproducing/pattern generating portion 55 applies gradation reproducing processing or the like (such as screen processing, edge enhancement processing, or gamma correction) to the decompressed image data, and generates image data of a registration pattern. The LED control portion 56 controls operation of each of the write portions 12Bk, 12C, 12M, and 12Y. The control signal generating portion 57 calculates the sub-scan valid signal settings (Bk_VD, C_VD, M_VD, Y_VD) of each color based on the output data from the color registration error correction computing portion 50 described later.

Turning to FIG. 1 again, the color registration error correction computing portion 50 calculates the typical value or the like used for color registration error correction. This color registration error correction computing portion 50 serves as a position change quantity calculator, an image forming start position calculator, an image forming region calculator, and a typical value calculator as claimed in the claims. That is, the color registration error correction computing portion 50 calculates the position change quantity at each belt position of the transfer belt 20, the typical value of the position change quantity, a distance between a reference position of the transfer belt 20 and an image forming start position, and a position of an image forming region exists on the transfer belt 20, or the like.

Figure 4:
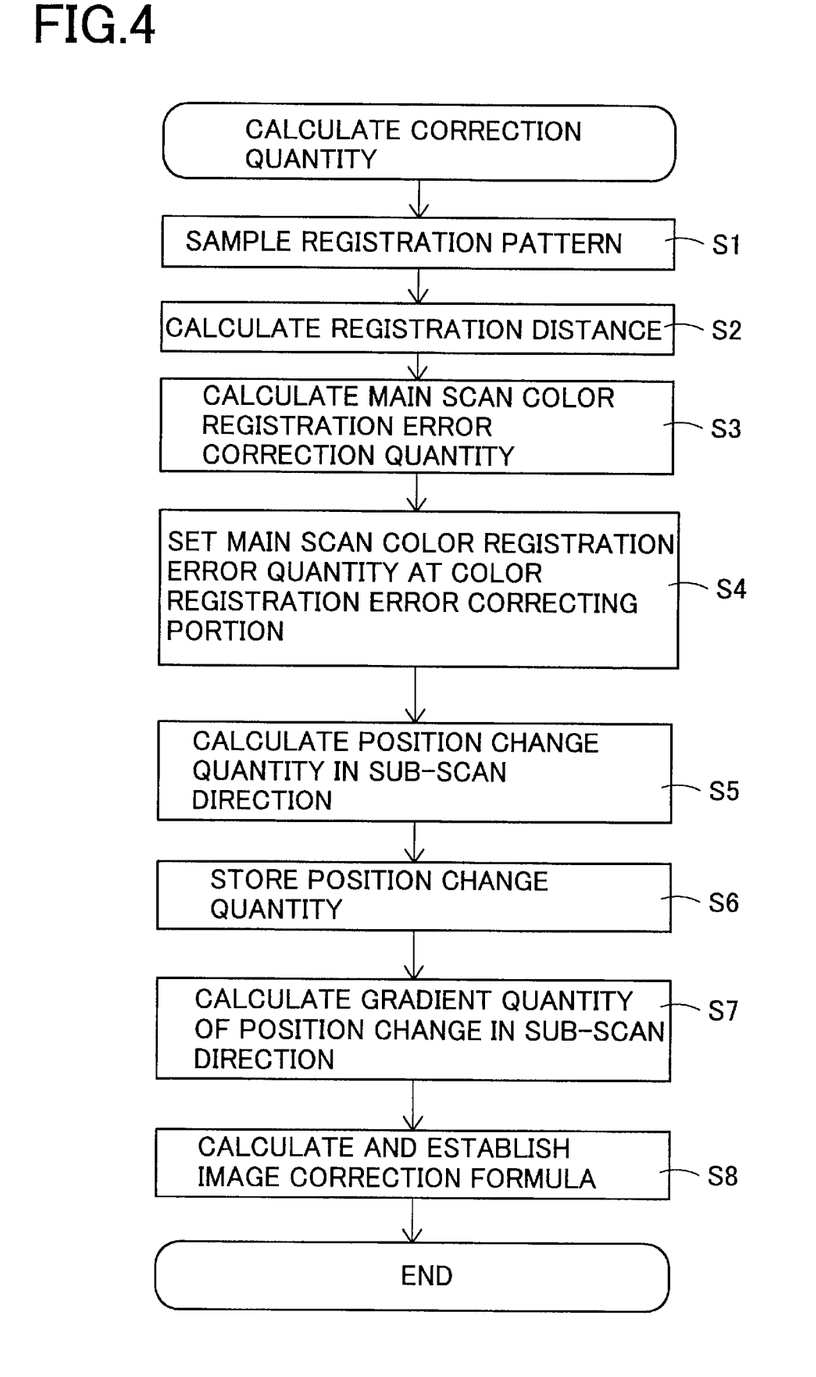
FIG. 4 is a flow chart regarding calculation of color registration error correction quantity during a non-image formation period.
Figure 5A:
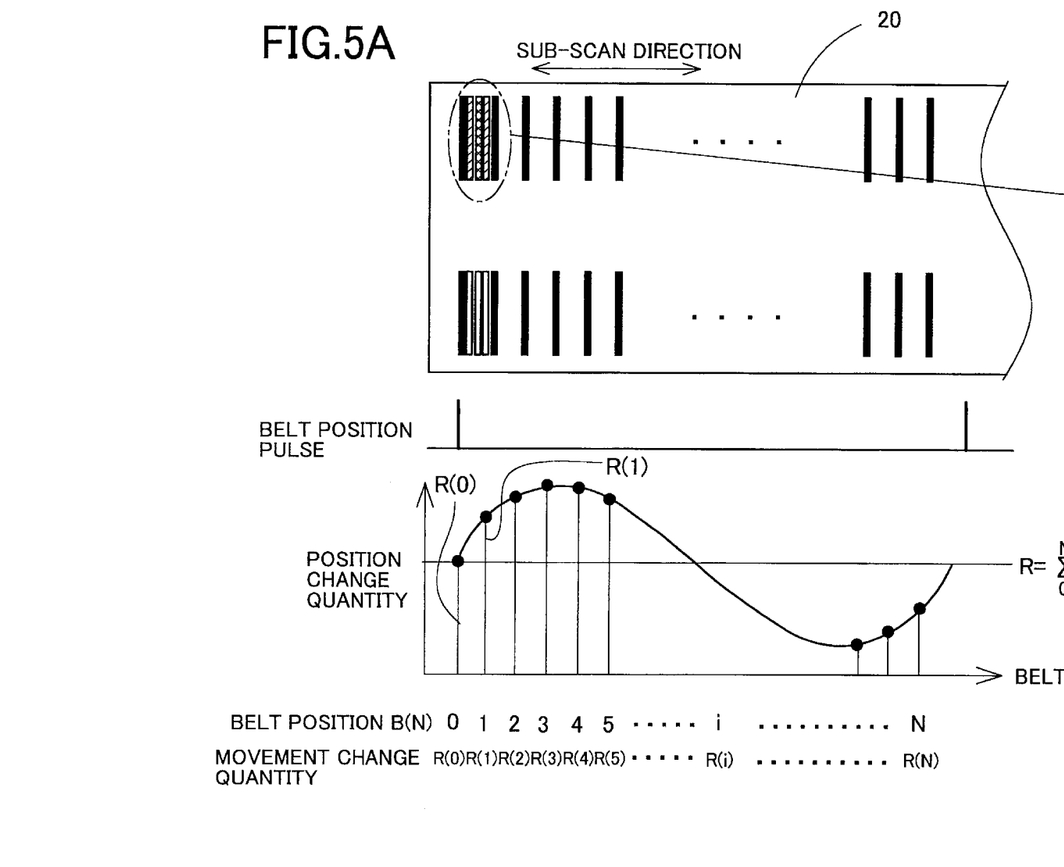
FIG. 5 is a diagram to explain detection operation of position change quantity.
Figure 5B:
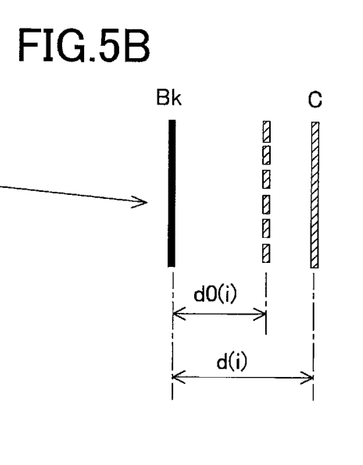

Now, operation of thus constructed image forming apparatus 10 will be described here. First, operation immediately after the power has been turned ON will be described with reference to a flow chart shown in FIG. 4 and with reference to FIG. 5. When the image forming apparatus 10 is powered ON, the registration pattern RP shown in FIG. 2A is formed on the transfer belt 20 by each of the image forming portions 11Bk, 11C, 11M, and 11Y (refer to FIG. 5A). Here, the registration pattern RP is not always maintained to be constant at intervals for each color due to the speed change or the like of the transfer belt 20. That is, for example, as shown in FIG. 5B, a position change (position error) occurs with cyan (C) when black (Bk) is defined as a reference. Then, by the registration detecting sensor RS, the registration pattern RP formed on the transfer belt 20 is repeatedly sampled with predetermined time intervals (S1).

By doing this, noise elimination, smoothing and gravity point detection relevant to sampling data are carried out by the color registration error correction computing portion 50, and a registration distance of another color relevant to a reference color is calculated (S2). Subsequently, the color registration error correction quantity of another color relevant to a reference color in a main scan direction (hereinafter, referred to as "a main scan color registration error correction quantity") is calculated (S3). Then, the calculated main scan color registration error correction quantity is set to the color registration error correcting portion 53 (refer to FIG. 3) (S4).

Figure 6:
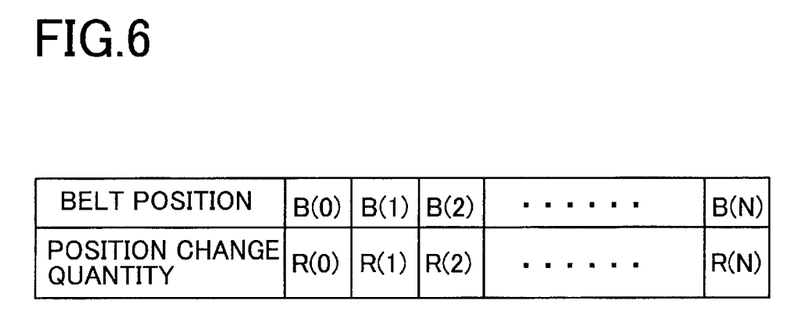
FIG. 6 is diagram to explain data storage at a position change quantity storage portion.

In addition, by the color registration error correction computing portion 50, the position change quantity R (N) of another color relevant to the reference color in the sub-scan direction is calculated in accordance with the formula below (S5).

$$R(N)=d(i)-d0(i)$$

where d (i) denotes a distance calculated from sampling data at each belt position, and d0 (i) denotes an ideal distance at each belt position. Here, the position change quantity by the entire periphery of the transfer belt 20 is calculated, and the result is shown in FIG. 5A. Then, the calculated position change quantity R (N), as shown in FIG. 6, is stored in a position change quantity storage portion 47 corresponding to an address N of each belt position (S6).

Further, a gradient quantity of the position change of another color relevant to the reference color in the sub-scan direction is calculated by the color registration error correction computing portion 50 (S7), an image correction formula is established from the calculated gradient quantity of the position change, and the calculated formula is set at the color registration error correcting portion 53 (refer to FIG. 3) (S8).

By means of the above processing, every time the image forming apparatus 10 is powered ON, the position change quantity of another color relevant to the reference color in the sub-scan direction is newly stored in the position change quantity storage portion 47, and the main scan color registration error correction quantity and image correction formula are newly stored in the color registration error correcting portion 53.

Figure 7:
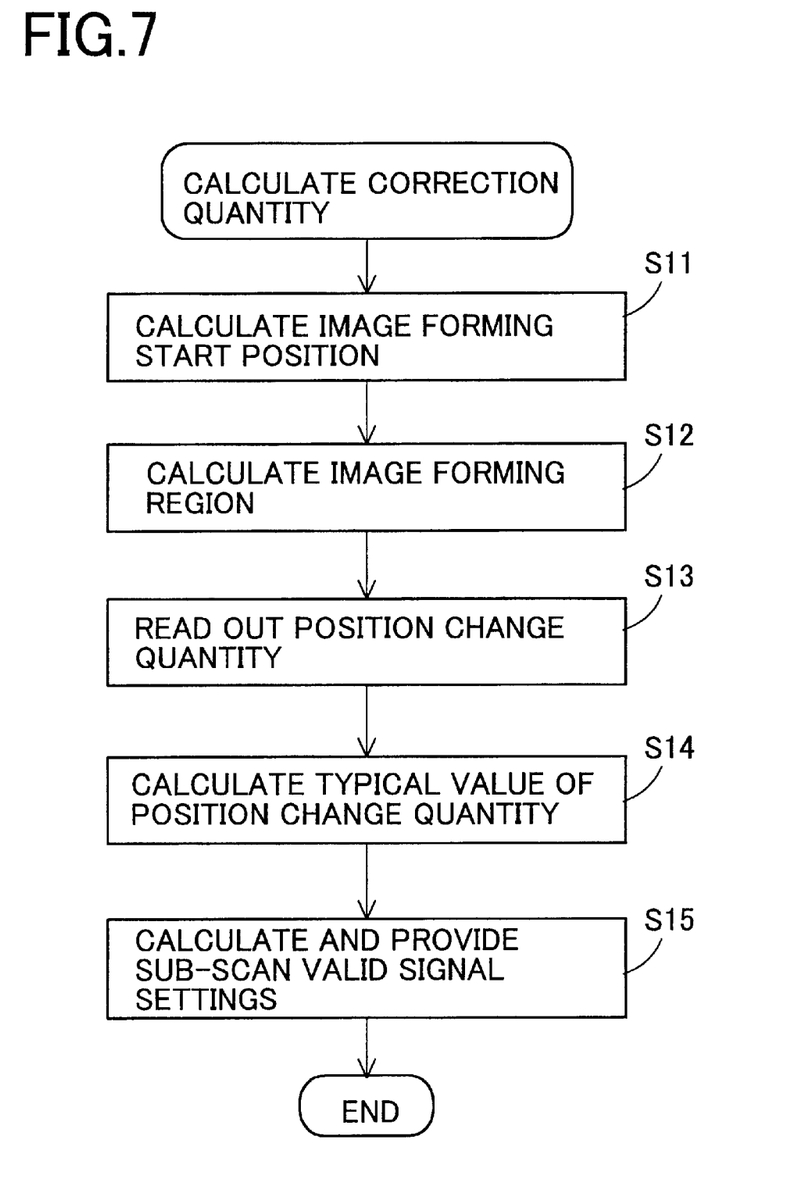
FIG. 7 is a flow chart regarding calculation of color registration error correction quantity during an image formation period.
Figure 8:
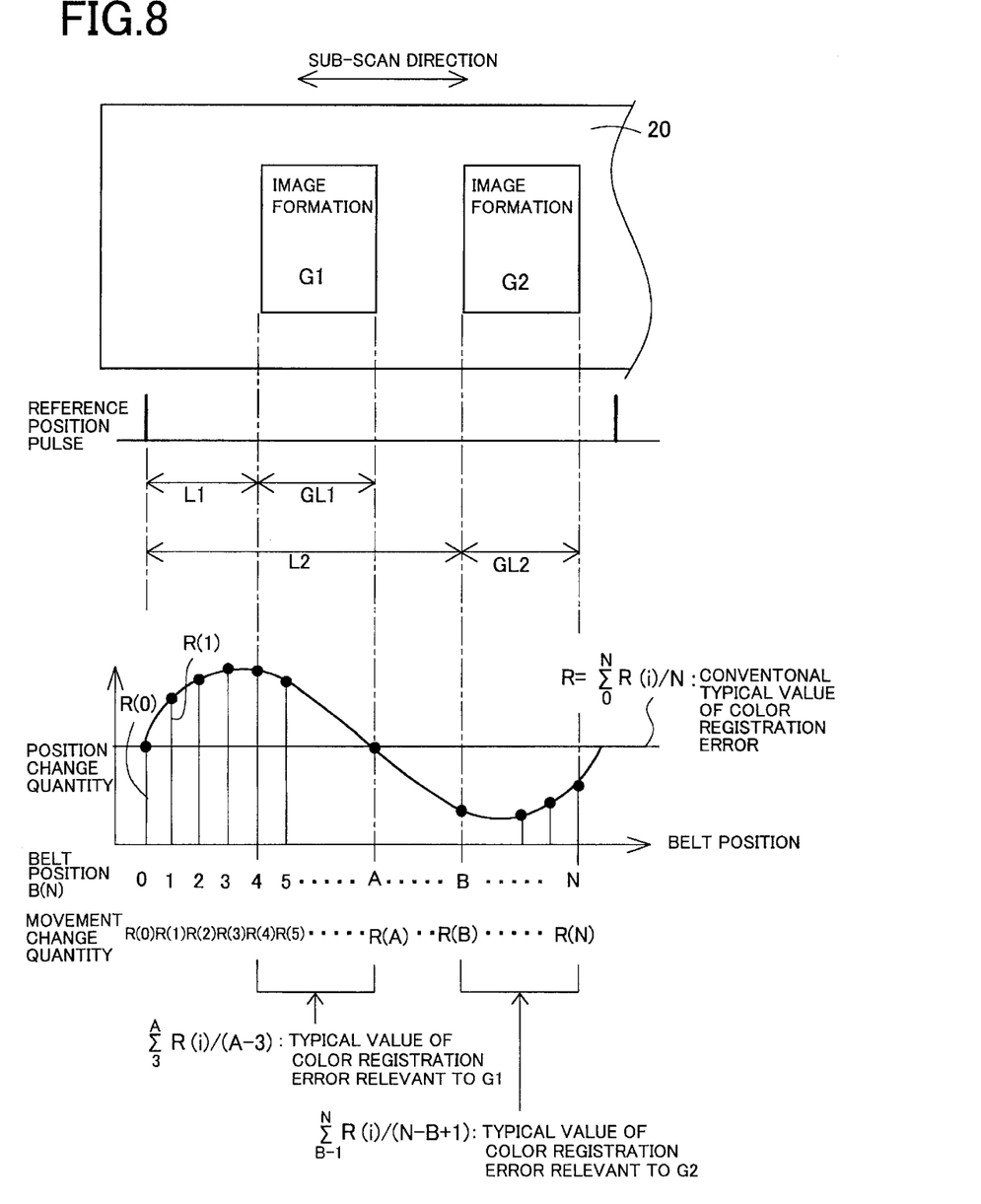
FIG. 8 is a diagram to explain a manner of typical value calculation regarding color registration error correction.

Now, operation of the image forming apparatus 10 during an image formation will be described with reference to a flow chart shown in FIG. 7 and with reference to FIG. 8 and FIG. 9. First, by the color registration error correction computing portion 50, a distance between the reference position of the transfer belt 20 and the image forming start position is calculated based on a reference position pulse outputted from a belt position detecting sensor BS (S11). In the case shown in FIG. 8, L1 is calculated for an image forming region G1, and L2 is calculated for an image forming region G2. In the case shown in FIG. 9, L3 is calculated for an image forming region G3.

Next, a position of an image forming region on the transfer belt 20 is calculated based on the calculated distance and image length (S12). In the case shown in FIG. 8, a position of the image forming region G1 is calculated based on a distance L1 and an image length GL1. That is, the image forming region G1 is calculated assuming that the region exists at any of belt positions B (4) to B (A). Similarly, based on a distance L2 and an image length GL2, an image forming region G2 is calculated assuming that the region exists at any of belt positions between B (B) and B (N). In addition, in the case shown in FIG. 9, based on a distance L3 and an image length GL3, an image forming region G3 is calculated assuming that the region exists at any of belt position between B (3) and B (C).

Then, the position change quantity R (N) of another color relevant to the reference color at each belt position that corresponds to an image forming region is read out from the position change quantity storage portion 47 (S13). In the case shown in FIG. 8, the position change quantities R (3) to R (A) and R (B-1) to R (N) are read out from the position change quantity storage portion 47. In addition, in the case shown in FIG. 9, R (2) to R (C) are read out from the position change quantity storage portion 47.

By doing so, the typical value of the position change quantity R (N) read out from the position change quantity storage portion 47 is calculated for each image forming region (S14). Here, an average value is employed as a typical value. In the case shown in FIG. 8, the typical value relevant to the image forming region G1 is calculated by formula 1, and the typical value relevant to the image forming region G2 is calculated by formula 2.

$$\sum_{3}^{A} R(i)/(A-3) \qquad \text{[Formula 1]}$$

$$\sum_{B=1}^{N} R(i)/(N-B+1) \qquad \text{[Formula 2]}$$

Figure 9:
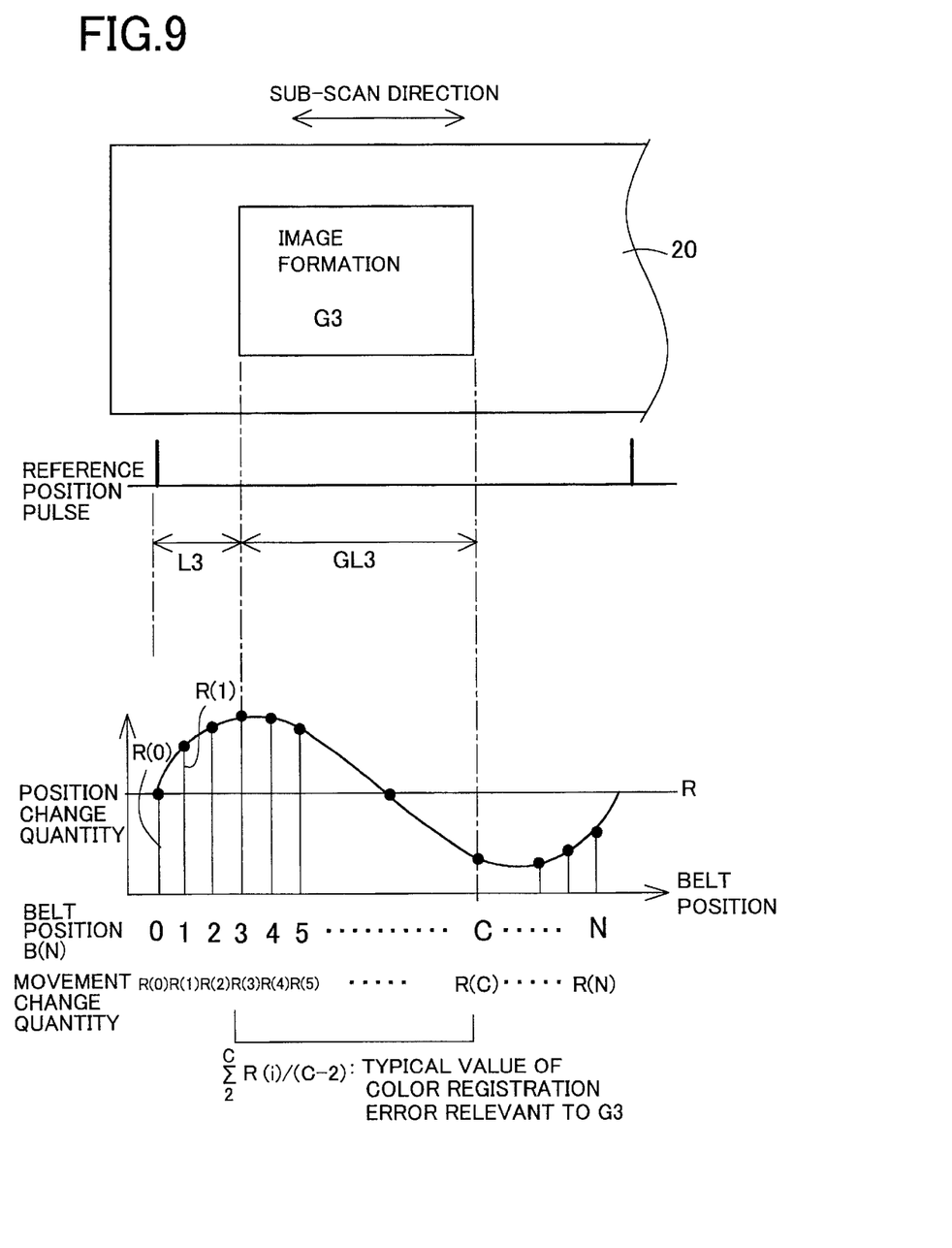
FIG. 9 is also a diagram to explain a manner of typical value calculation regarding color registration error correction.

Similarly, in the case shown in FIG. 9, the typical value relevant to the image forming region G3 is calculated by formula 3.

$$\sum_{2}^{C} R(i)/(C-2) \qquad \text{[Formula 3]}$$

In this way, the optimal typical value for each image forming region is calculated without only one average value of the position change quantity over the full periphery of the transfer belt 20 being calculated as a typical value. Then, by the color registration error correction computing portion 50, the sub-scan valid signal settings of another color relevant to the reference color is calculated based on these typical values, and the calculated sub-scan valid signal settings are provided to the color registration error correcting portion 53 (S15).

Thereafter, by using image data obtained when color registration error correction has been carried out based on the sub-scan valid signal settings, each of the write portions 12Bk, 12C, 12M, and 12Y writes an electrostatic latent image into each of the photosensitive drums 13Bk, 13C, 13M, and 13Y, respectively. Therefore, the toner image of each color transferred to be superimposed on the transfer belt 20 is precisely superimposed, and a high quality multi-color image free of color registration error is formed. In addition, the typical value of color registration error correction is calculated for each image forming region, and required color registration error correction for each image forming region is carried out. Thus, uniform coloring between pages is maintained.

As has been described above in detail, according to the image forming apparatus 10 of the present embodiment, the optimal typical value of the position change quantity is calculated for each image forming region at the color registration error correction computing portion 50. Then, based on these typical values, the write timing at each of the write portions 12Bk, 12C, 12M, and 12Y is controlled by the image control portion 30. That is, color registration error correction is executed based on the optimal correction quantity for each image forming region. In this manner, an occurrence of color registration error can be reliably prevented. In addition, when images are formed by a plurality of pages, color registration error correction is done based on the optimal correction quantity for each page, and uniform coloring among pages can be maintained.

The present embodiment is provided for a mere illustrative purpose, and does not limit the present invention. Therefore, according to the present invention, various modifications or alterations can occur without departing from the spirit of the invention. For example, in the above described embodiments, although an LED array is employed for each of the write portions 12Bk, 12C, 12M, and 12Y, a laser can be employed. However, in the case of employing a laser, the linearity in the main scan direction is inferior to that of the LED array. Therefore, it is desirable that three or more registration detecting sensors RS are disposed in the main scan direction. Accordingly, it is, of course, required to generate registration patterns RP in number equal to that of registration detecting sensors RS.

In addition, of course, the present invention is applicable to an image forming apparatus (ink jet process) in which an ink jet head is employed for an image forming portion 11 (color codes Bk, C, M, and Y are omitted here); an image forming apparatus (silver salt process) employing a silver salt exposure head; or an image forming apparatus employing a photosensitive belt instead of a photosensitive drum. Further, the above described advantageous effect can be attained.

What is claimed is:

1. An image forming apparatus comprising:
   a plurality of image forming units;
   an image carrier for carrying an image produced by superimposing images formed at the plurality of image forming units;
   a detection device for detecting a position of an image forming region on the image carrier;
   a calculating device for calculating a typical value of position change quantity of other colors against a reference color in an image forming region detected by the detection device;
   a controller for controlling operation of the plurality of image forming units based on a typical value calculated by the calculating device; and
   a position detecting sensor for detecting a reference position provided on the image carrier, wherein the detection device calculates an image forming start position based on a detection result of the position detecting sensor, and detects a position of an image forming region based on the image forming start position calculated by the detection device and a length of an image formed by each image forming unit.

2. An image forming apparatus according to claim 1, wherein the controller controls a timing that each image forming unit writes an image on the image carrier.

3. An image forming apparatus according to claim 1, wherein the position detecting sensor detects a reference position every traveling cycle of the image carrier.

4. An image forming apparatus according to claim 1 further comprising a position change quantity calculator for calculating position change quantity in a plurality of predetermined positions of the image carrier.

5. An image forming apparatus according to claim 4, wherein the position change quantity calculator calculates position change quantity based on a registration pattern formed on the image carrier by each image forming unit.

6. An image forming apparatus according to claim 4 further comprising a storage device for storing position change quantity calculated by the position change quantity calculator.

7. An image forming apparatus according to claim 5, wherein the calculating device readouts position change quantity on the predetermined position of the image carrier that corresponds to the image forming region detected by the detection device from the storage device, then calculates the typical value of the position change quantity readout.

8. An image forming apparatus comprising:
   a plurality of image forming units for forming images with different colors;
   an image carrier for carrying a multi-color image produced by superimposing images formed at each of the image forming units sequentially;
   a position detecting sensor for detecting a reference position provided at the image carrier;
   a position change quantity calculator for calculating position change quantity of other colors against a reference color;
   a storage device for storing position change quantity calculated by the position change quantity calculator;
   an image forming start position calculator for calculating an image forming start position based on a detection signal detected by the position detecting sensor;
   an image forming region calculator for calculating a position of an image forming region on the image carrier based on an image forming start position calculated by the image forming start position calculator and a length of an image formed by each of the image forming units;
   a typical value calculator for reading out position change quantity at a predetermined position of the image carrier that corresponds to an image forming region calculated by the image forming region calculator from the storage device, and calculating a typical value of the position change quantity readout; and
   a controller for controlling operation of the plurality of image forming units based on a typical value for each image forming region calculated by the typical value calculator.

9. An image forming apparatus according to claim 8, wherein the position change quantity calculator calculates position change quantity of each predetermined position on the image carrier based on a registration pattern formed on the image carrier by the plurality of image forming units during a non-image formation period.

10. An image forming apparatus according to claim 8, wherein the position detecting sensor detects a reference position every traveling cycle of the image carrier.

11. An image forming apparatus according to claim 8, wherein the position change quantity calculator calculates position change quantity of each predetermined position, in a plurality of predetermined positions on the image carrier determined based on the detection signal detected by the position detecting sensor.

12. An image forming apparatus according to claim 8, wherein the controller controls image write timing of each image forming unit.

13. An image forming apparatus comprising:
- a plurality of image forming units for forming images with different colors;
- an image carrier for carrying a multi-color image produced by superimposing images formed at each of the image forming units sequentially;
- a position detecting sensor for detecting a reference position provided on the image carrier every traveling cycle of the image carrier;
- a position change quantity calculator for calculating position change quantity of other colors against a reference color at a respective one of a plurality of predetermined positions on the image carrier determined based on a detection signal detected by the position detecting sensor;
- a storage device for storing the position change quantity calculated by the position change quantity calculator;
- an image forming start position calculator for calculating an image forming start position based on the detection signal detected by the position detecting sensor;
- an image forming region calculator for calculating a position of an image forming region on the image carrier based on the image forming start position calculated by the image forming start position calculator and a length of an image formed by each of the image forming units;
- a typical value calculator for reading out position change quantity at a predetermined position on the image carrier that corresponds to the image forming region calculated by the image forming region calculator from the storage device, and calculating the typical value of the position change quantity readout; and
- a controller for controlling image write timing of each image forming unit based on a typical value of each image forming region calculated by the typical value calculator.

14. An image forming apparatus according to claim 13, wherein the position change quantity calculator calculates position change quantity of each predetermined position on the image carrier based on a registration pattern formed on the image carrier by the plurality of image forming units during a non-image formation period.

* * * * *